United States Patent Office 3,524,809
Patented Aug. 18, 1970

3,524,809
HYDROCRACKING PROCESS AND CATALYST
Rowland C. Hansford, Yorba Linda, Calif., assignor to Union Oil Company of California, Los Angeles, Calif., a corporation of California
No Drawing. Continuation-in-part of application Ser. No. 371,186, May 29, 1964, which is a continuation-in-part of application Ser. No. 244,918, Dec. 17, 1962. This application Jan. 11, 1968, Ser. No. 697,029
Int. Cl. C10g 13/02
U.S. Cl. 208—111                4 Claims

ABSTRACT OF THE DISCLOSURE

Zeolite hydrocracking catalysts displaying an optimum combination of activity and hydrothermal stability comprise a minor proportion of a Group VIII noble metal deposited on a Y zeolite cracking base containing less than 1.5 weight-percent $Na_2O$, and wherein about 50–60% of the zeolitic ion-exchange capacity is satisfied by hydrogen ions and about 30–40% by magnesium ions.

PARENT APPLICATIONS

This application is a continuation-in-part of application Ser. No. 371,186, filed May 29, 1964, and now abandoned, which in turn is a continuation-in-part of application Ser. No. 244,918, filed Dec. 17, 1962, now U.S. Pat. No. 3,364,135.

BACKGROUND AND SUMMARY OF INVENTION

It has recently been discovered (U.S. Pat. No. 3,130,006) that certain silica-rich zeolitic molecular sieves of the Y crystal type (natural or synthetic faujasite), in their ammonium form, can be heated at relatively high temperatures to decompose the ammonium ions, and that the resulting deammoniated zeolites still exhibit a high degree of crystallinity and surface area, and have a relatively high acidity. There is some question as to whether the heating of the ammonium zeolites produces a hydrogen zeolite or a "decationized" (cation-deficient) zeolite, but it is clear that, (a) hydrogen zeolites are formed upon initial thermal decomposition of the ammonium zeolite, and (b) if true decationization does occur upon further heating of the hydrogen zeolites, the decationized zeolites also possess desirable catalytic activity. Both of these forms, and the mixed forms, are designated herein as being "metal-cation-deficient," or "demetallized." The terms "protonated zeolite" and "hydrogen zeolite" as employed herein, are intended to be synonymous.

The formation of crystalline, metal-cation-deficient zeolites as above described is in sharp contrast to the results obtained when molecular sieve zeolites having $SiO_2/Al_2O_3$ mole-ratios below about 3.0 are similarly treated. In the case of these low-silica zeolites, e.g., the X molecular sieves, thermal deammoniation of the pure ammonium zeolites results in a complete collapse of the crystal structure with resultant marked decrease in surface area.

As a result of their high acidity and surface area, the demetallized zeolites of the Y crystal type have been found to be very useful as bases for catalysts to be employed in reactions such as hydrocracking or isomerization, which require a combination of a highly acid base with a hydrogenating component such as palladium, platinum or nickel.

One of the difficulties which has been encountered in using catalysts based on completely demetallized Y zeolites resides in their relatively poor hydrothermal stability, i.e., their ability to retain crystallinity and surface area after contact with water vapor at high temperatures. Any substantial loss in surface area results in a corresponding decrease in catalytic activity. In the case of catalysts prepared from conventional demetallized Y zeolites, wherein the sodium content ($Na_2O$) is less than about 3% by weight, it is often observed that there is an almost complete collapse of crystal structure upon hydration of the catalyst, followed by heating to drive off the water. The collapse in crystal structure is often accompanied by a decrease in surface area from figures in the neighborhood of 800–1,000 square meters per gram down to 20–100 square meters per gram. Losses in surface area of this magnitude are substantially fatal to continued catalytic activity.

Hydrothermal stability of catalysts is important in cracking and hydrocracking processes, particularly when the catalyst is to be periodically regenerated by combustion of deactivating deposits. Many feedstocks are contaminated with water. Also, in the shipping of the catalyst, and loading of catalytic reactors, it is difficult to avoid contacting the catalyst with moist air, and where the catalyst rapidly adsorbs water as in the present case, it may be in a substantially hydrated condition by the time it is loaded in the reactor. This water is subsequently desorbed during the heat-up or reaction period, and it is during this period that the greatest damage may occur. During regeneration, the catalyst is subjected to oxidation with oxygen-containing gases at relatively high temperatures of, e.g., 800–1,200° F., and since the combustible deposits on the catalyst normally include hydrocarbons, a considerable amount of water is generated by oxidation. Also, the input regeneration gases normally contain substantial amounts of water, unless expensive drying techniques are employed. It is obvious therefore, that in nearly any commercial use of solid catalysts, it is important that they exhibit a high degree of hydrothermal stability.

A considerably higher degree of hydrothermal stability can be obtained in the case of metal-cation-deficient Y zeolites by only partially exchanging the sodium with ammonium ion, and then decomposing the sodium-ammonium zeolite to form a partially demetallized zeolite containing, e.g., about 4–6% by weight of $Na_2O$. (As initially prepared, the sodium Y zeolite contains about 12–15% by weight of $Na_2O$.) However, although improved hydrothermal stability can be obtained by this means, it is found that when more than about 3% by weight of $Na_2O$ remains in the zeolite, the catalytic activity suffers greatly, and some loss in activity occurs when the $Na_2O$ content is greater than about 1%. Apparently, sodium in amounts greater than about 1–1.5%, tends to neutralize the active acidic centers on the catalyst. It would therefore be highly desirable to provide methods for maintaining hydrothermal stability in those demetallized zeolite compositions containing less than about 3%, and preferably less than 1.5%, by weight of $Na_2O$.

It is known (U.S. Pat. No. 3,236,762) that the deleterious effects of sodium in the catalyst bases can be overcome to some extent by partially exchanging the sodium zeolites with certain less basic polyvalent metals such as magnesium, calcium, etc. (Only partial exchange can here be achieved, due to the difficulty of obtaining complete displacement of monovalent sodium by a polyvalent metal.) It has been found that the resulting sodium-polyvalent metal zeolites are considerably more stable hydrothermally than the demetallized zeolites. However, they are deficient in catalytic activity. Thus, the magnesium zeolites, while being quite stable hydrothermally, normally require temperatures about 50–100° F. higher than the corresponding demetallized zeolites for the same conversion. It would be highly desirable to provide a zeolite catalyst base having the stability of the magnesium zeolites, and the activity of the demetallized zeolites. The catalysts of this invention, to a substantial extent, have achieved this objective.

It has now been discovered that a hydrocracking catalyst base displaying an optimum combination of activity and hydrothermal stability is produced when (1) the sodium content of the base is reduced to less than about 1.5 weight-percent Na$_2$O, (2) sufficient hydrogen ions are introduced to satisfy about 50–60% of the ion-exchange capacity, and (3) sufficient magnesium ions are introduced to satisfy about 30–40%, preferably about 35%, of the ion-exchange capacity. These catalysts display an activity almost as high as the pure hydrogen zeolite forms, and a hydrothermal stability almost as high as the pure magnesium forms. Moreover, the magnesium-stabilized catalysts are found to be considerably more active than analagous catalysts stabilized with equivalent proportions of other polyvalent metals, e.g. calcium.

DETAILED DESCRIPTION OF CATALYSTS

In their sodium form, the general formula for the Y molecular sieve zeolites of this invention is expressed as follows:

$$0.9 \pm 0.2 Na_2O : Al_2O_3 : WSiO_2 : XH_2O$$

where X=0 to about 9, and W=3 to about 6, preferably 4–6. Sodium zeolites of this nature, and methods for their preparation are described in U.S. Pat. No. 3,130,007.

There are at least two different procdeures by which the foregoing sodium zeolites can be converted to the partially demetallized, polyvalent metal zeolites of this invention:

*Method 1.*—The sodium zeolite is subjected to ion exchange with an aqueous solution containing both a magnesium salt and a soluble ammonium salt, whereby simultaneous replacement of sodium with magnesium and ammonium occurs, followed by heating to decompose the ammonium ion.

*Method 2.*—The sodium zeolite is first subjected to ion-exchange with an aqueous solution of a soluble ammonium salt in order to replace about 80–100% of the sodium with ammonium ion, followed by a partial back-exchange of the zeolitic ammonium ions with magnesium followed by heating to decompose the remaining ammonium ions.

The second of these methods is preferred. Method 1 is not preferred because, firstly, it is difficult to maintain control over the relative proportions of magnesium, sodium, and ammonium ions in the resulting product. In the preferred method, it is a relatively simple matter to replace 90–99% of the sodium ions with ammonium ions during the initial ion-exchange step. There is thus assured a final composition having an extremely low sodium content. In the back-exchange step with magnesium salt, it is also easy to control the degree of displacement of ammonium ion with magnesium ion. Finally, for reasons which are incompletely understood, it is found that the second method generally yields a more stable and active catalyst than the first method, even where the final compositions contain the same zeolitic ion distribution. Following is a more detailed description of this preferred method of manufacture:

*Ammonium ion-exchange step.*—The essential feature involves simply contacting the sodium zeolite with an aqueous solution of substantially any soluble ammonium salt. Preferred salts are ammonium chloride, ammonium citrate, ammonium acetate, ammonium sulfate and the like. However other salts may be employed, including substituted ammonium salts such as methyl ammonium chloride. Procedurally, the ion-exchange can be carried out either continuously or batch-wise, using aqueous solutions of ammonium salts of, e.g., 1–20 molar concentration, preferably at elevated temperatures of about 50–100° C. In continuous operations the ammonium salt solution is percolated through a bed of the sodium zeolite until the desired degree of ion-exchange has taken place.

In batch operations it is preferable to employ several stages, wherein the sodium zeolite is first digested with a batch of ammonium salt solution, then filtered off and contacted with a fresh solution. Ordinarily, about 3–6 stages are desirable.

In any case, the ammonium ion exchange is terminated when the Na$_2$O content of the zeolite has been reduced to below about 3–4% by weight, and preferably to between about 0 and 1.5%. This means that more than about 70–80% of the zeolitic sodium, and preferably at least about 90%, should be replaced with ammonium ion. The subsequent addition of stabilizing magnesium ion eliminates the need for leaving any sodium in the product. After filtering and washing with water, the ammonium zeolite is then ready for the partial back-exchange treatment with magnesium salt.

*Magnesium back-exchange step.*—This step may be carried out in substantially the same manner as the preceding ammonium exchange step, merely replacing the ammonium salt with the desired magnesium salt. Here again, substantially any soluble magnesium salt may be used, e.g., the chloride, nitrate, sulfate, acetate, etc.

Following the back-exchange step, the resulting zeolite may be filtered off, washed, dried and calcined to produce the desired magnesium-stabilized zeolite. The final hydrocracking catalyst is formed by adding a small proportion of one or more of the Group VIII metals, preferably a Group VIII noble metal. Specifically, it is preferred to employ about 0.1% to 3% by weight of palladium, platinum, rhodium, ruthenium or iridium. These Group VIII metals may be added by impregnation of the calcined (deammoniated) zeolite, but preferably they are formed by ion-exchange prior to, during, or directly after the magnesium back-exchange step, i.e., before the ammonium zeolite is decomposed to form the metal-cation-deficient zeolite.

To incorporate the Group VIII metals by ion exchange, the magnesium-ammonium zeolite, still in a hydrous form, is digested with an aqueous solution of a suitable compound of the desired metal wherein the metal is present in a cationic form. Preferably, fairly dilute solutions of the Group VIII metal salts are employed, and it can be assumed that there will be a substantially quantitative exchange of ammonium ion for the Group VIII metal. This ion-exchange procedure is described more specifically in U.S. Pat. No. 3,236,762. The exchanged metal-ammonium zeolite is then filtered off, washed, dried and calcined in order to decompose the remaining ammonium ions. The resulting catalyst powders are then pelleted in the usual manner.

Table 1 below lists several exemplary catalysts contemplated herein, and which can be prepared by the methods described above. In each case, the catalysts are derived from an original sodium Y sieve zeolite prepared in the conventional manner from silica hydrosol, sodium aluminate and sodium hydroxide, the resulting sodium zeolite having a SiO$_2$/Al$_2$O$_3$ mole-ratio of about 4.7, and containing about 14% by weight of Na$_2$O.

TABLE 1

| Catalyst No. | MgO, wt. percent | Na$_2$O wt. percent | Percent of exchange sites protonated and/or decationized | Hydrogenating Metal, wt. percent |
| --- | --- | --- | --- | --- |
| 1 | 3.7 | 1.2 | 50 | Pd-0.5 |
| 2 | 3.2 | 1.2 | 55 | Pd-0.5 |
| 3 | 2.8 | 1.2 | 60 | Pd-0.5 |
| 4 | 3.7 | 0.5 | 58 | Pt-0.5 |
| 5 | 2.8 | 0.5 | 50 | Ni-4.0 |
| 6 | 3.2 | 0.5 | 55 | Rh-0.4 |

Activation to convert the ammonium zeolites to corresponding protonated and/or decationized zeolites is ordinarily accomplished by calcining the catalyst at about 700–1,120° F., preferably 850–1,050° F., for about 0.5 to 24 hours. On the centigrade scale, a convenient equivalent temperature range is from about 350–600° C. Temperatures up to about 1,300° F. (705° C.) may be employed without significant destruction of crystallinity. The calcining is preferably carried out at or below atmospheric pressure in an oxidizing atmosphere such as air, preferably substantially dry air having a dew point below about 0° F. The use of an oxidizing atmosphere is especially desirable when the zeolite contains a Group VIII noble metal hydrogenating component which is subject to agglomeration when heated to these temperatures in a reducing or inert atmosphere. Reducing atmospheres such as hydrogen, or inert atmospheres such as nitrogen may be utilized however in cases where metal agglomeration is not a problem. The calcined zeolites, prepared as described, ordinarily display an initial surface area in the range of about 700–1,000 square meters per gram.

As an example of a suitable activation treatment, the ammonium zeolites, after drying at 200–300° F., may be slowly heated to a temperature of about 1,020° F., and held at that temperature for about 2 hours in a circulating stream of dry air having a dew point of about −40° F. Good results are also obtained at temperatures of about 930° F.

Hydrothermal stability of the catalysts of this invention is measured by rehydrating the catalysts in moist air at room temperature until they are substantially saturated, and then recalcining for 12 hours at 900° F. Surface area is then measured again, and the difference between the initial surface area and the area after recalcining is taken as a measure of hydrothermal stability.

The finished catalysts are useful for the hydrocracking of mineral oil fractions boiling between about 300–1,000° F., to produce desired lower boiling hydrocarbons, e.g., gasoline, jet fuel, heating oils, etc. Suitable hydrocracking conditions for catalyst compositions containing about 0.2 to 1% by weight of palladium or platinum, fall within the following ranges:

TABLE 2

| | Operative | Preferred |
|---|---|---|
| Temperature, ° F | 400–800 | 500–750 |
| Pressure, p.s.i.g | 500–2,500 | 750–2,000 |
| LHSV | 0.1–10 | 0.5–5 |
| $H_2$/oil ratio, s.c.f./b | 1,000–20,000 | 2,000–12,000 |

The following examples are cited to illustrate the invention, but are not to be construed as limiting in scope:

EXAMPLE I

This example illustrates in detail the preparation of one of the optimum catalysts of this invention.

(A) *Preparation of sodium zeolite.*—Into a large vessel containing 9,520 ml. of distilled water is stirred 750 grams of Nalco No. 680 sodium aluminate. To this solution is then added 1,940 grams of sodium hydroxide and the solution is allowed to cool to 70° F. About 13,600 grams of colloidal silica hydrosol (Ludox—about 30.0 weight-percent $SiO_2$), is then added rapidly while stirring vigorously. The resulting slurry is then set aside to age at room temperature for about 24 hours. The mole-ratios of reactants in the mixture are as follows:

$Na_2O/SiO_2$ -------------------------------- 0.42
$SiO_2/Al_2O_3$ -------------------------------- 20
$H_2O/Na_2O$ -------------------------------- 38

At the end of the 24-hour aging period, the mixture is then heated to about 200–205° F., and maintained at that temperature for about 48 hours during which crystallization of the sodium zeolite occurs. The resulting slurry is then filtered, washed with hot water and air dried. The resulting composition contains about 14 weight-percent $Na_2O$ on a dry basis, and has a $SiO_2/Al_2O_3$ mole-ratio of about 4.7.

(B) *Ammonium ion-exchange.*—The hydrated sodium zeolite from part (A) is stirred and heated for about 1 hour at 90° C. with a 27% ammonium chloride solution in water, the proportions being such as to provide 75 grams of ammonium chloride in 200 ml. of water for each 100 grams of anhydrous sodium zeolite. The slurry is then filtered and the filter cake washed with hot water. This ion-exchange procedure is then repeated four more times, and the resulting ammonium zeolite is then found to contain 1.4 weight-percent of $Na_2O$, indicating that about 90% of the original sodium has been replaced with ammonium ions.

(C) *Back-exchange with magnesium sulfate.*—About 550 grams of the wet ammonium zeolite from part (B) is slurried in 500 ml. of distilled water, and to the resulting slurry is added slowly a solution of 76.5 grams of $MgSO_4 \cdot 7H_2O$ in 300 ml. of distilled water. Stirring is continued for about 1 hour, and the mixture is then filtered and the filter cake washed with water. At this point the zeolite is about 20% back-exchanged with magnesium. About 339 grams of this wet material is then again dispersed in 500 ml. of distilled water, and to the slurry is added 66.6 grams of $MgSO_4 \cdot 7H_2O$ dissolved in 300 ml. of water, followed by stirring for another hour. Upon filtration and washing, the final product is found to be about 32% back-exchanged (about 3 weight-percent MgO on a dry basis).

(D) *Addition of palladium.*—The wet magnesium-ammonium zeolite from part (C) is slurried with about an equal weight of water. Then a solution of tetrammine palladium chloride, containing the stoichiometric amount of palladium calculated to provide 0.5 weight-percent palladium in the final product, is added very slowly with constant stirring. Absorption of palladium from this solution is substantially quantitative. The slurry is then filtered, and the filter cake washed with distilled water.

(E) *Pelleting of catalyst.*—The wet filter cake from (D) is dried to about 15–25% water content at 250° F., granulated through a 20-mesh screen, mixed with about 1% of hydrogenated corn oil, powder, and pelleted in a pellet press.

(F) *Activation of catalyst.*—The pellets from step (E) are gradually heated to about 900° F. during about 4 hours and held at this temperature for 12 hours to remove water and to decompose the ammonium ions, whereupon there is obtained a final catalyst composition containing 0.5 weight-percent palladium, 1.4 weight-percent $Na_2O$, and about 3 weight-percent MgO. This catalyst has excellent hydrothermal stability, and is substantially equal in hydrocracking activity to a corresponding hydrogen and/or decationized zeolite catalyst prepared in the same manner except for omission of the magnesium back-exchange step (C).

EXAMPLE II

In order to demonstrate the critical stabilizing effect of magnesium, a series of five catalysts were prepared essentially as described in Example I. Each catalyst was a Y molecular sieve zeolite containing 0.5 weight-percent of zeolitic palladium, and varying proportions of magnesium ions and sodium ions, produced by varying the degree of back-exchange of the ammonium zeolite with magnesium. After the final calcining to decompose ammonium ions, the surface of each catalyst was measured by a nitrogen adsorption technique at a relative pressure of about 0.02. Then samples of each catalyst were substantially completely hydrated (20–25% by weight $H_2O$) in moist air, recalcined for 12 hours at 900° F., and surface areas were again determined. Finally, the rehydration-recalcination-surface area measurement sequence was repeated a second time, and the results were as follows:

TABLE 3

| Catalyst No. | Zeolitic cation-charge distribution [a] | | | Surface area, m.²/g. | | | | |
|---|---|---|---|---|---|---|---|---|
| | Mg | H [c] | Na | Initial | One hydration | Percent drop [b] | Two hydrations | Percent drop [b] |
| 1 | 0 | 90 | 10 | 751 | 214 | 72 | 43 | 94 |
| 2 | 20 | 70 | 10 | 744 | 274 | 63 | 181 | 76 |
| 3 | 35 | 55 | 10 | 792 | 582 | 27 | 537 | 32 |
| 4 | 55 | 37 | 8 | 744 | 710 | 5 | 673 | 10 |
| 5 | 79 | 13 | 8 | 692 | 632 | 9 | 632 | 9 |

[a] Percent of total exchange capacity.
[b] Percent drop from initial surface area.
[c] And/or decationized sites.

It is thus apparent that, for acceptable stability, at least about 30%, and preferably at least about 35%, of the total ion exchange capacity should be satisfied with magnesium ions. But increasing the magnesium content above about 40% contributes little in added stability.

EXAMPLE III

This example illustrates a hydrocracking process using the catalyst of Example II, and also provides a comparison of relative activities.

Three hydrocracking runs were performed using catalysts 1, 3 and 5 of Example II. The feed was a hydrogenated gas oil having the following characteristics:

Gravity, ° API—33.0
Boiling range, ° F.—440–830
Nitrogen, p.p.m.—7
Sulfur, p.p.m.—11
Vol. percent aromatics—27

The feed was hydrocracked over each catalyst at 1,000 p.s.i.g., 1.5 LHSV, 8,000 s.f.c. $H_2$/B feed, and at temperatures adjusted to give 50% conversion to 400° F. end-point gasoline per pass. The hydrocracking temperature is thus inversely proportional to catalyst activity. The results were as follows:

TABLE 4

| Catalyst No. | Percent of exchange sites satisfied by $Mg^{++}$ | Temperature (° F.) for 50% conversion after— | | |
|---|---|---|---|---|
| | | 25 hrs. | 50 hrs. | 75 hrs. |
| 1 | 0 | 570 | 586 | |
| 3 | 35 | 540 | 549 | 549 |
| 5 | 79 | 555 | 568 | 568 |

Catalysts 3 and 5 thus appear to be more active than the magnesium-free catalyst 1. This however is believed to be due to some slight hydrolytic damage to catalyst No. 1, which is unstable. In the absence of hydrolytic damage, the magnesium-free catalyst shows substantially the same activity as catalyst No. 3, which contains an optimum proportion of magnesium. Catalyst No. 5 is very stable, but is less active due to its relative deficiency in protonated and/or decationized exchange sites. The 19° F. lower temperature required at 50 and 75 hours for catalyst 3 represents an approximate doubling of activity as compared to catalyst 5.

EXAMPLE IV

To illustrate the deleterious effects of sodium in the catalysts, a series of three metal-cation-deficient Y sieve catalysts, each containing 0.5% Pd and varying amounts of sodium, were compared for hydrocracking activity, using a feed and conditions similar to those of Example III, except that the pressure was 1,500 p.s.i.g. and the space velocity 1.0. The temperatures required for 50% conversion to gasoline were as follows:

TABLE 5

| Catalyst No. | Zeolitic cation-charge distribution | | Temperature (° F.) for 50% conversion after 50 hrs. |
|---|---|---|---|
| | H [1] | Na | |
| 6 | 93 | 7 | 509 |
| 7 | 86 | 14 | 528 |
| 8 | 79 | 21 | 540 |

[1] And/or decationized.

At higher sodium levels the activity drops off even more precipitously.

To illustrate the superiority of magnesium as a stabilizing polyvalent metal, two additional catalysts were prepared by methods similar to those described in Example I, except that in one case calcium chloride was substituted for magnesium sulfate in step (C). Each of the resulting catalysts was about 40% back-exchanged with calcium or magnesium, and contained 0.5 weight-percent palladium and 0.9 weight-percent $Na_2O$. The resulting catalysts were tested for hydrocracking activity at 1000 p.s.i.g., 8000 s.c.f./B of hydrogen and 1.5 LHSV, using a substantially sulfur- and nitrogen-free gas oil feed having an API gravity of 39.4. The temperatures required to maintain 55 volume-percent conversion to $C_4^+$ gasoline at 30 hours on stream were as follows:

TABLE 6

| Catalyst No. | Zeolitic cation-charge distribution | | | | Temperature (° F.) required for 55% conversion |
|---|---|---|---|---|---|
| | Na | Ca | Mg | H | |
| 9 | 6.5 | 40 | 0 | 53.5 | 508 |
| 10 | 6.5 | 0 | 40 | 53.5 | 486 |

The 22° F. lower temperature required for catalyst 10 represents approximately a 100% increase in activity over catalyst 9.

It is not intended that the invention should be limited to the details described above since many variations may be made by those skilled in the art without departing from the scope or spirit of the following claims:

I claim:

1. A process for hydrocracking a mineral oil feedstock to produce lower boiling hydrocarbons, which comprises contacting said feedstock plus added hydrogen with a hydrocracking catalyst at hydrocracking temperatures and pressures, said hydrocracking catalyst comprising a molecular sieve zeolite of the Y crystal type wherein about 50–60% of the total ion-exchange capacity thereof is metal-cation-deficient as a result of decationization and/or replacement of zeolitic metal cations with hydrogen ions, said catalyst containing: (1) less than about 1.5 percent by weight of zeolitic sodium calculated as $Na_2O$; (2) sufficient combined zeolitic magnesium ions to satisfy at least about 30% but not more than about 40% of the total ion-exchange capacity of said zeolite and to provide a substantial increase in hydrothermal stability thereof; and (3) a minor proportion of a Group VIII noble metal hydrogenating component, and recovering lower boiling hydrocarbons from said contacting.

2. A process as defined in claim 1 wherein said Group VIII noble metal is palladium.

3. A process as defined in claim 1 wherein about 35% of the ion-exchange capacity of said zeolite is satisfied by magnesium ions.

4. A process as defined in claim 1 wherein said catalyst was prepared by:
   (1) contacting a sodium zeolite of the Y crystal type with an aqueous solution of an ammonium salt, thereby forming an ammonium zeolite containing less than about 1.5 weight-percent $Na_2O$;
   (2) subjecting said ammonium zeolite to a back-exchange treatment with an aqueous solution of a magnesium salt to partially replace zeolitic ammonium ions and form a mixed-cation zeolite wherein about 50–60 percent of the total ion-exchange capacity is still satisfied by ammonium ions, and 30–40 percent by magnesium ions;

(3) contacting said mixed-cation zeolite with an aqueous solution of a Group VIII noble metal compound to deposit thereon between about 0.5% and 3% by weight of noble metal; and (4) drying and calcining the resulting noble metal mixed-cation zeolite at high temperatures in order to decompose remaining zeolitic ammonium ions.

References Cited

UNITED STATES PATENTS 3,236,762 2/1966 Rabo et al. _____ 208—111

DELBERT E. GANTZ, Primary Examiner

A. RIMENS, Assistant Examiner

U.S. Cl. X.R.

252—455